US 7,106,918 B2

(12) United States Patent
Bita et al.

(10) Patent No.: US 7,106,918 B2
(45) Date of Patent: Sep. 12, 2006

(54) STRUCTURALLY CHIRAL MATERIALS EXHIBITING MAGNETO-GYROTROPY

(75) Inventors: Ion Bita, Somerville, MA (US); Edwin L. Thomas, Natick, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 236 days.

(21) Appl. No.: 10/851,587

(22) Filed: May 21, 2004

(65) Prior Publication Data

US 2005/0008308 A1      Jan. 13, 2005

Related U.S. Application Data

(60) Provisional application No. 60/482,212, filed on Jun. 24, 2003.

(51) Int. Cl.
*G02F 1/295* (2006.01)
*C04B 35/00* (2006.01)

(52) U.S. Cl. ............... 385/6; 385/141; 385/140; 385/130; 385/131; 252/62.51 R

(58) Field of Classification Search ........... 385/141, 385/6, 8, 11, 129, 130, 131, 132, 140; 252/62.51 R, 252/513, 299.01
See application file for complete search history.

(56) References Cited

U.S. PATENT DOCUMENTS

| 5,165,059 A * | 11/1992 | Engheta et al. ............. 385/142 |
|---|---|---|
| 2001/0038325 A1 | 11/2001 | Smith et al. ................ 333/202 |
| 2002/0162988 A1* | 11/2002 | Figotin et al. ......... 252/62.51 R |
| 2005/0008308 A1* | 1/2005 | Bita et al. ................... 385/123 |
| 2006/0018584 A1* | 1/2006 | Watts et al. .................. 385/11 |

OTHER PUBLICATIONS

"Experimental Verification of a Negative Index of Refraction," Shelby et al. *Science.* Apr. 2001. vol. 292.
"Negative Refraction Makes a Perfect Lens," Pendry. *Physical Review Letters.* Oct. 2000. vol. 85, No. 18.
"Fabrication of Tetragonal Square Spiral Photonic Crystals," Kennedy et al. *Nano Letters.* 2002. vol. 2, No. 1.
"Frozen Light," S. John. *Nature.* Dec. 1997. vol. 390.
"Nonreciprocal Magnetic Photonic Crystals," Figotin et al. *Physical Review E.* 2001. vol. 63.
"Fabrication of Photonic Crystals for the Visible Spectrum by a Holographic Lithography," Campbell et al. *Nature.* Mar. 2000. vol. 404.
"The Magnetic-Field-Induced Birefrigerence of the Ferronematic Liquid Crystals," Chen et al. *Molecular Crystals and Liquid Crystals.* vol. 144 (1987).
"Optical Properties of Magnetically Doped Cholesterics," sah et al.. *Liquid Crystals.* vol. 15, No. 1, pp. 25-30 (1993).
"Efficient Adaptive Feedback Control of Ultrafast Semiconductor Nonlinearities," Kunde et al. (*QUELS 2001*) *Postconference Technical Digest.* vol. 57, pp. 195-196 (May 2001).
"A Monofilar Spiral Antenna Excited Through a Heliecal Wire," Nakano et al. *IEEE Transactions on Antennas and Propogation*, vol. 51, n. 3 (Mar. 2003).

* cited by examiner

*Primary Examiner*—Brian M. Healy
(74) *Attorney, Agent, or Firm*—Gauthier & Connors LLP

(57) ABSTRACT

A structured material is disclosed with magneto-gyrotropic characteristics including at least one continuous structurally-chiral material. The structured material has an electric permittivity and a magnetic permeability at least one of which varies within the structured material along a first direction in a repetitious fashion wherein a repetition unit includes a chiral component and is at least 25 nm in length. The structured material exhibits non-reciprocal electromagnetic wave propagation velocity characteristics along a second direction that includes a non-zero component along the first direction.

54 Claims, 13 Drawing Sheets

STRUCTURALLY CHIRAL MATERIALS EXHIBITING MAGNETO-GYROTROPY

PRIORITY

This application claims priority to U.S. Provisional Patent Application Ser. No. 60/482,212 filed Jun. 24, 2003.

This invention was made with government support under Grant No. DMR-0213282 awarded by the National Science Foundation. The government has certain rights in the invention.

BACKGROUND

The invention relates to materials and devices for use with electromagnetic fields and relates in particular to materials and devices through which electromagnetic fields may propagate in unconventional ways. The ability of such devices to propagate electromagnetic fields in unconventional ways permits the materials to be used for a variety of known and yet unknown applications.

For example, U.S. Published Patent Application No. 2001/0038325 discloses a left-handed composite media for use at microwave frequencies in which negative effective electrical permittivity and negative effective magnetic permeability are simultaneously provided. Such materials with negative effective electrical and magnetic permeability are disclosed to be suitable for use as microwave lenses, beam steering elements, and prisms.

A negative index of refraction for incident radiation at the frequency of light has been demonstrated using photonic crystals in *Superprism Phenomena in Photonic Crystals*, by H. Kosaka, T. Kawashime, A. Tomita, M. Notomi, T. Tamamura, T. Sato and S. Kawakami, PHYSICAL REVIEW B, vol. 58, No. 16 (October 1998). Such materials are disclosed to provide a propagation beam swing of ±90 degrees responsive to a ±12 degrees shift in the angle of incident radiation by modifying the group velocity of the incident radiation. A negative index of refraction has also been demonstrated in the vicinity of the photonic band gap in *Theory of Light Propagation in Strongly Modulated Photonic Crystals: Refractionlike Behavior in the Vicinity of the Photonic Band Gap*, by M. Notomi, PHYSICAL REVIEW B, vol. 62, No. 16 (October 2000). In particular, this article discloses that negative refraction is possible in regimes of negative group velocity and negative effective index above the first photonic band near the Brillouin zone center ($\Gamma$).

Other types of devices have been disclosed to be suitable for propagating light in one direction only. For example, U.S. Published Patent Application No. 2002/0162988 discloses a unidirectional gyrotropic photonic crystal that is disclosed to permit electromagnetic wave propagation of a certain frequency in one direction while impeding the electromagnetic wave propagation in the opposite direction.

Certain further materials are known to affect the circular polarization and amplitude of light. For example, U.S. Pat. No. 6,411,635 discloses a composite for use in selective single-mode lasing that includes a doped chiral medium. The selection is disclosed to be accomplished by producing an appropriate spatial gain distribution inside the chiral laser medium. U.S. Pat. No. 6,396,859 discloses a chiral structure that includes a defect in the form of a twist, and is disclosed to be used for filters, lasers and detectors. International PCT Publication WO 02/073247 discloses chiral substrate that is formed as a fiber to provide a fiber Bragg grating.

There continues to be a need however, for further materials and devices that provide unconventional electromagnetic field propagation characteristics, such as for example, slowing down light in one direction only, and that may provide directionality characteristics in two or three dimensions.

SUMMARY

The invention provides a structured material with magneto-gyrotropic characteristics including at least one continuous structurally-chiral material in accordance with an embodiment of the invention. The structured material has an electric permittivity and a magnetic permeability at least one of which varies within the structured material along a first direction in a repetitious fashion wherein a repetition unit includes a chiral component and is at least 25 nm in length. The structured material exhibits non-reciprocal electromagnetic wave propagation velocity characteristics along a second direction that includes a non-zero component along the first direction.

In accordance with another embodiment, the invention provides a photonic crystal having both magneto-optic activity and structural chirality. The photonic crystal has a refractive index that varies within the structured material along a first direction in a repetitious fashion wherein a repeat unit includes a continuous structurally chiral material. The photonic crystal exhibits non-reciprocal electromagnetic wave propagation velocity characteristics in a second set of directions that are not perpendicular to the first direction.

In accordance with another embodiment, the invention provides a waveguide having a central longitudinal axis, displaying both magneto-gyrotropic characteristics and structural chirality along the central longitudinal axis. The waveguide has an electric permittivity and a magnetic permeability at least one of which varies along the central longitudinal axis in a repetitious fashion, such that the waveguide displays non-reciprocal electromagnetic wave propagation characteristics along the central longitudinal axis.

In accordance with a further embodiment, the invention provides a system for achieving non-reciprocal electromagnetic wave propagation characteristics. The system includes a structured material exhibiting both magneto-gyrotropy and structural chirality. The structured material has an electric permittivity and magnetic permeability at least one of which varies in a repetitious fashion along at least a first direction, wherein the repetition unit includes a continuous structurally chiral material. The electromagnetic wave propagation characteristics are manifested in any second direction that is not perpendicular to the first direction.

BRIEF DESCRIPTION OF THE DRAWINGS

The following description may be further understood with reference to the accompanying drawings in which.

Figure 1A:
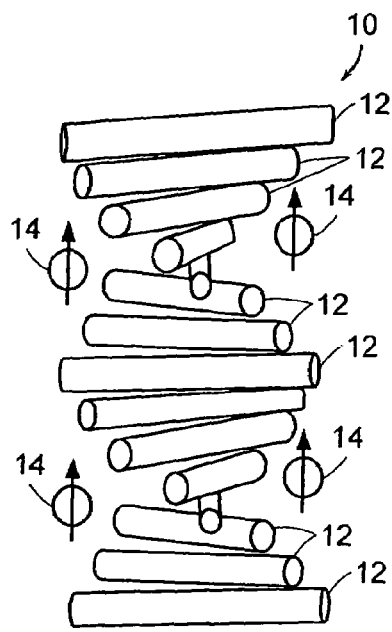
FIGS. 1A and 1B show illustrative diagrammatic views of one-dimensional periodic photonic crystals in accordance with various embodiments of the invention.

The drawings are show for illustrative purposes only and are not to scale.

DETAILED DESCRIPTION OF THE ILLUSTRATED EMBODIMENTS

The invention relates to the design of a photonic crystal that provides extraordinary properties arising from the general design of constituent materials. Such properties may include an effective negative refractive index and the ability to significantly reduce the propagation speed of light at multiple frequencies (both externally tunable and switchable) in various embodiments of the invention, as well as the ability to effectively stop light inside the structure at a particular strength of the external stimuli (and release it when the external stimulus is adjusted). This special interaction with electromagnetic waves may be produced at any optical (visible, infrared) or microwave (radar) frequencies, allowing the disclosed matter to a have a potentially significant impact in various scientific and technological areas that will be enabled by these exceptional properties.

An important characteristic of a photonic crystal formed in accordance with an embodiment of the invention is the presence of both magneto-gyrotropy and structural chirality (or handedness) in the underlying material structure. Due to the interplay of these material symmetry elements, electromagnetic waves are restricted to propagate in only a few special ways. As mentioned above, certain properties arise that are not observed in conventional materials. First, light propagates differently in opposite directions through such materials, as the dependence of light frequency, $\omega$, on the wavevector $\vec{k}$ becomes non-reciprocal $\omega(\vec{k}) \neq \omega(-\vec{k})$. Second, external fields (magnetic, mechanical, etc.) may tune the position of two frequency intervals where light is allowed to propagate along one direction with a certain velocity while in the opposite direction is restricted to only one electromagnetic mode that has drastically smaller group velocity. Using such fields may lead to the latter velocity to be completely reduced to zero, thus leading to a state of light localization (e.g., frozen light). At this frequency, both the first and second-derivatives of $\omega$ with respect to $\vec{k}$ become zero at a particular value of $\vec{k}$, which corresponds to an electromagnetic wave with zero group velocity and infinite mass of the photon. Further, for other frequency intervals (which can be placed by design in any desired spectral region), light propagates through the material experiencing an effective negative refractive index, which is a concept of significant scientific and technological interest at present. The disclosed material design is also valuable because it allows fabrication of optically, infra-red and microwave active devices in certain embodiments.

Photonic materials of various embodiments of the invention rely on the presence of magneto-gyrotropy in structurally chiral (or handed) materials. Magneto-gyrotropy comprises the phenomena related to electromagnetic wave propagation in materials where the permittivity ($\underline{\epsilon}$) and/or permeability ($\underline{\mu}$) tensors have at least a pair of non-zero complex conjugate off-diagonal elements in the principal material coordinate system ($\epsilon_{i,j \neq i} \neq 0$) causing well known gyrotropic effects (Faraday and Kerr wave polarization rotation, circular birefringence, etc.). For magneto-gyrotropic materials, the constitutive tensors are not symmetric ($\epsilon_{ij} \neq \epsilon_{ji}$ and/or $\mu_{ij} \neq \mu_{ji}$), but they in fact become Hermitian ($\epsilon_{ij} = \epsilon^*_{ji}$ and/or $\mu_{ij} = \mu^*_{ji}$, where the star (*) denotes complex conjugate). Such materials are common, most of them containing well known magnetic atoms, and are generally classified into two groups. The first group comprises pure metals and metallic alloys, and the second group contains dielectric and semimagnetic compounds. See for example, *Modern Magnetooptics and Magnetooptical Materials*, A. K. Zvezdin, and V. A. Kotov, Institute of Physics Publishing, Bristol and Philadelphia (1997).

A description of structural chirality in certain embodiments includes the representation of a spiral, which may display either a right-hand or left-hand chirality. This handedness may arise in each of 1, 2 and 3 dimensions. Structural chirality is common in materials, and it can be the result of an intrinsic material organization tendency, or can be produced by directed organization in man-made fabrication processes. For embodiments desired to be active at microwave frequencies (gigahertz, millimeter wavelengths) the fabrication becomes trivial due to the macroscopic nature of the constitutive elements.

Figure 1B:
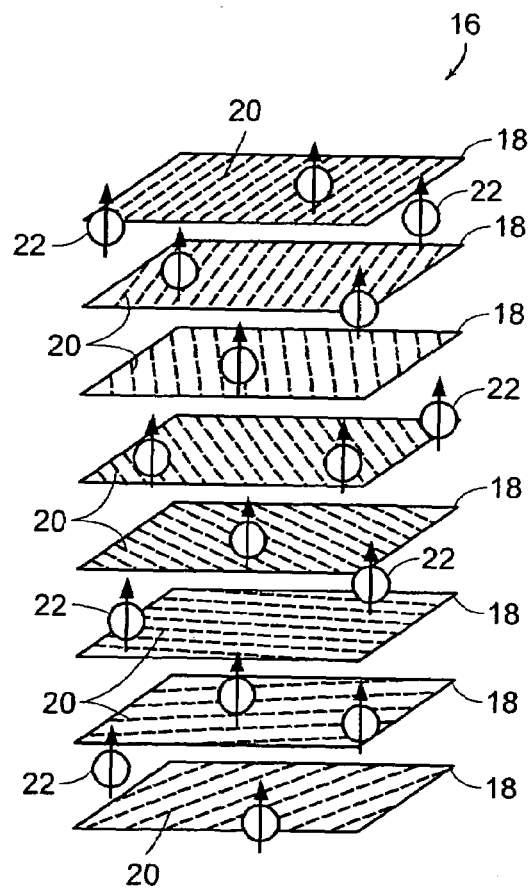

FIGS. 1A and 1B show two examples of one-dimensional (1D) structures that are suitable for visible and infra-red operation. FIG. 1A contains a diagrammatic representation of a 1D periodic cholesteric liquid crystal composite 10 that includes rod-like liquid crystal molecules 12 periodically twisting along a helix axis upon doping with a chiral molecule). The composite 10 also includes a plurality of magnetizable particles 14 that may be randomly distributed about the molecules 12. These particles may be smaller than the wavelength of interest to avoid scattering losses (e.g., smaller than 1/10 of the wavelength), and should coact to create a relatively strong and uniform magnetic field around the molecules 12 in the presence of an externally applied magnetic field. In other embodiments, the material that forms a helix or other chiral structure may itself be either externally magnetizable or may be formed of a permanent magnet. The period of a full revolution of the helix may be, for example, at least as long as a wavelength of the electromagnetic field of interest, such as 100 nm. In particular, the wavelength of interest may be the wavelength for which the non-reciprocal electromagnetic field propagation properties are achieved.

FIG. 1B shows a 1D periodic cholesteric liquid crystal composite 16 that can be viewed as being made of a plurality of layers 18 of oriented elements 20. Each molecular layer is slightly rotated with respect to a previous layer such that the stack of layers 18 provides a continuous helical structure. The composite 16 may also include a plurality of magnetizable elements 22 as discussed above with reference to FIG. 1A. In further embodiments, it may be possible to use this approach to have a non-zero net magnetic activity even in the absence of the external magnetic field, for example by using rod-like particles, orienting them globally, then polymerizing the whole mixture, thereby freezing in the cholesteric (helical) structure with vertically oriented rods that have mangetooptic activity. This design may be suitable for visible and near-infra-red wavelengths since periodicity of the structure could be on the order of the wavelength, and cholesteric liquid crystals are known to have a pitch length from few hundreds of nanometers to microns. For longer wavelength radiation (e.g., microwave frequencies), it may be possible to stack thin foils that are optically uniaxial, making certain that each foil is slightly rotated from the previous one.

Figure 2A:
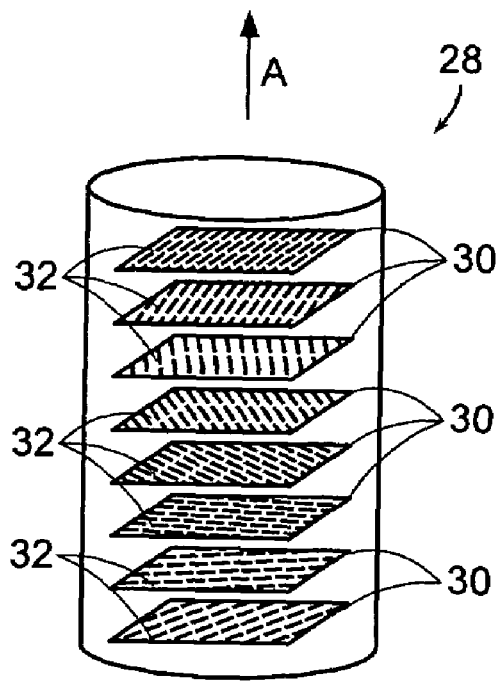
FIG. 2A shows an illustrative diagrammatic view of an element used to form a two-dimensional periodic photonic crystal in accordance with an embodiment of the invention.
Figure 2B:
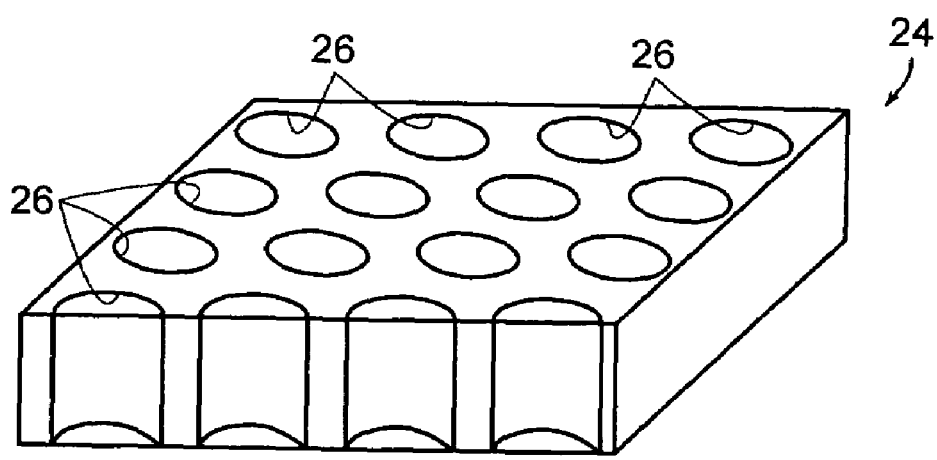
FIG. 2B shows an illustrative diagrammatic view another element with which a plurality of elements such as the one shown in FIG. 2A may be used to form a two-dimensional periodic photonic crystal in accordance with an embodiment of the invention.

FIGS. 2A and 2B show a two-dimensional (2D) composite in which a slab 24 includes plurality of holes 26, each of which receives a cholesteric liquid crystal 28 having a plurality of layers 30 of aligned elements 32 that are rotated with respect to each other as discussed above with reference to FIG. 1B. The elements 32 may be molecules having a size of about 1/100 of the diameter of the cylinder, or possibly about 1 nm. Magnetogyrotropic properties are provided for example, by using a magnetic material matrix, or by magnetizing the chiral liquid crystal with magnetizable particles inside the cylinders shown for clarity. The plurality of liquid crystal units 28 provide a plurality of parallel chirality axes (each aligned in the vertical direction as shown at A). Again, such a composite may be used for visible, near-infra-red or microwave operation. In further embodiments, other possible structures include those having multiple chirality axes resulting from packing of double twist cylinders on a simple cubic lattice ($P4_232$ symmetry), as seen in cholesteric blue phases II as disclosed for example, in *Lasing in a Three-Dimensional Photonic Crystal of the Liquid Crystal Blue Phase II*, W. Cao, A. Munoz, P. Palffy-Muhoray, and B. Taheri, Nature Materials, v.1, p. 111 (2002).

Figure 3A:
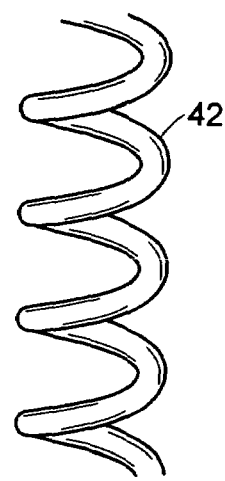
FIG. 3A shows an illustrative diagrammatic view of an element used to form a three-dimensional periodic photonic crystal in accordance with an embodiment of the invention.
Figure 3B:
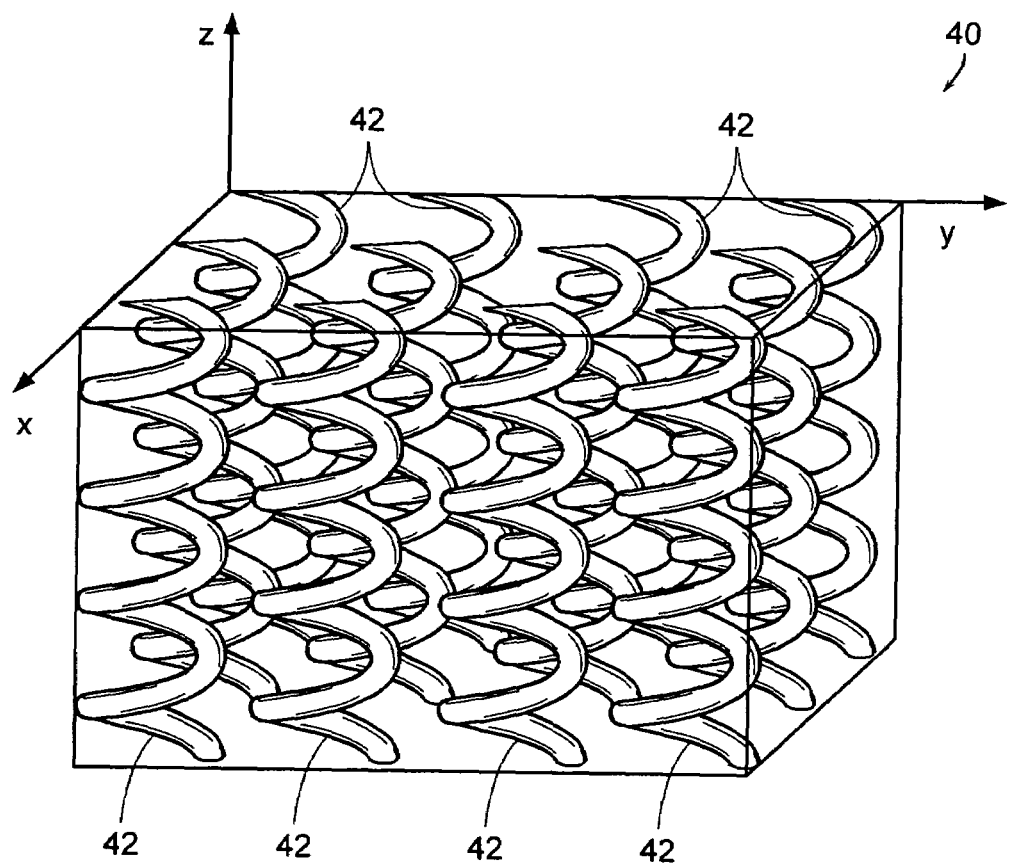
FIG. 3B shows an illustrative diagrammatic view of a three-dimensional periodic photonic crystal in accordance with an embodiment of the invention using a plurality of elements such as the element shown in FIG. 3A.

FIGS. 3A and 3B show a three-dimensional (3D) composite 40 in which spiral elements 42 having chirality axes along a z direction are provided in an x by y array as shown in FIG. 3B. The spiral elements 42 may be formed of a magnetic material, or in further embodiments, the composite 40 may include magnetizable elements as discussed above. The composite of FIG. 3B may be formed by glancing angle deposition techniques in which the chiral axis is perpendicular to substrate. See for example, *Fabrication of Tetragonal Square Spiral Photonic Crystals*, S. R. Kennedy, M. J. Brett, O. Toader and S. John, Nano Letters v.2, no. 1, p. 59 (2002). Other multidimensional chiral structures (e.g., single gyroid phase, $I4_132$ symmetry) could be produced by self-assembly, or by directed fabrication processes (e.g. interference lithography with elliptically polarized light) such as disclosed in *Fabrication of Photonic Crystals for the Visible Spectrum by Holographic Lithography*, M. Campbell, D. N. Sharp, M. T. Harrison, R. G. Denning, A. J. Turberfield, Nature, v.404, no. 6773, p. 53 (2000). In addition, post-processing may be used to enhance the optical properties while preserving the structural chirality of the material, such as filling the air spaces between the spiraling columns with magneto-gyrotropic media, or with a desired refractive index material needed (if the columns themselves are made of a magneto-gyrotropic medium).

In further embodiments, structures including two or three non-parallel chirality axes may be provided. For example, such further non-parallel chirality axes may be mutually orthogonal to one another. Since the exact theoretical prediction of the optical properties of such material structures may be difficult, especially when the constituents interact with light in complex ways, one may predict the optical properties expected from the interplay of magneto-gyrotropy and structural chirality by analyzing a one-dimensional material system, when the structure has only one chirality axis. Thus, the propagation of light in helical media (similar to that shown in FIG. 1A or 1B) in the presence of magneto-gyrotropy is examined as a representative problem. This may be referred to as representative because a wave propagating along the helical axis when the magneto-gyrotropic vector is also oriented along the same direction, should experience the maximum effects of this combination of optical property elements. In fact, the same qualitative effects may be found for electromagnetic waves that propagate along a direction on which both the magneto-gyrotropic vector and the helical axis have a non-zero projection (thus not necessarily strictly parallel).

Some of the special properties of the disclosed hybrid material become evident by examining certain operational diagrams that show dispersion relations $\omega(\vec{k})$, $\vec{k}=\hat{z}k_z$ matching the angular frequency $\omega$ to the corresponding spatial frequencies, $k_z$ (Bloch wavevector) of electromagnetic waves that are allowed to propagate along the $\hat{z}$-axis. The material is taken as the representative helical medium with uniform rotation (e.g., a uniform, perfectly circular spiraling) with its helical axis also along $\hat{z}$-axis. The parameter $\gamma$ is a measure of the strength of the magneto-gyrotropy along the same $\hat{z}$-axis, and its sign may be changed by reversing the direction of an external magnetic field. For any given frequency therefore, when $\gamma \neq 0$, the forward ($+\hat{z}$) or backward ($-\hat{z}$) propagating waves have a different $k_z$ and a different group velocity (the slope of the curve at $k_z$), which show that light will be transmitted differently along opposite paths through this material.

Figure 4:
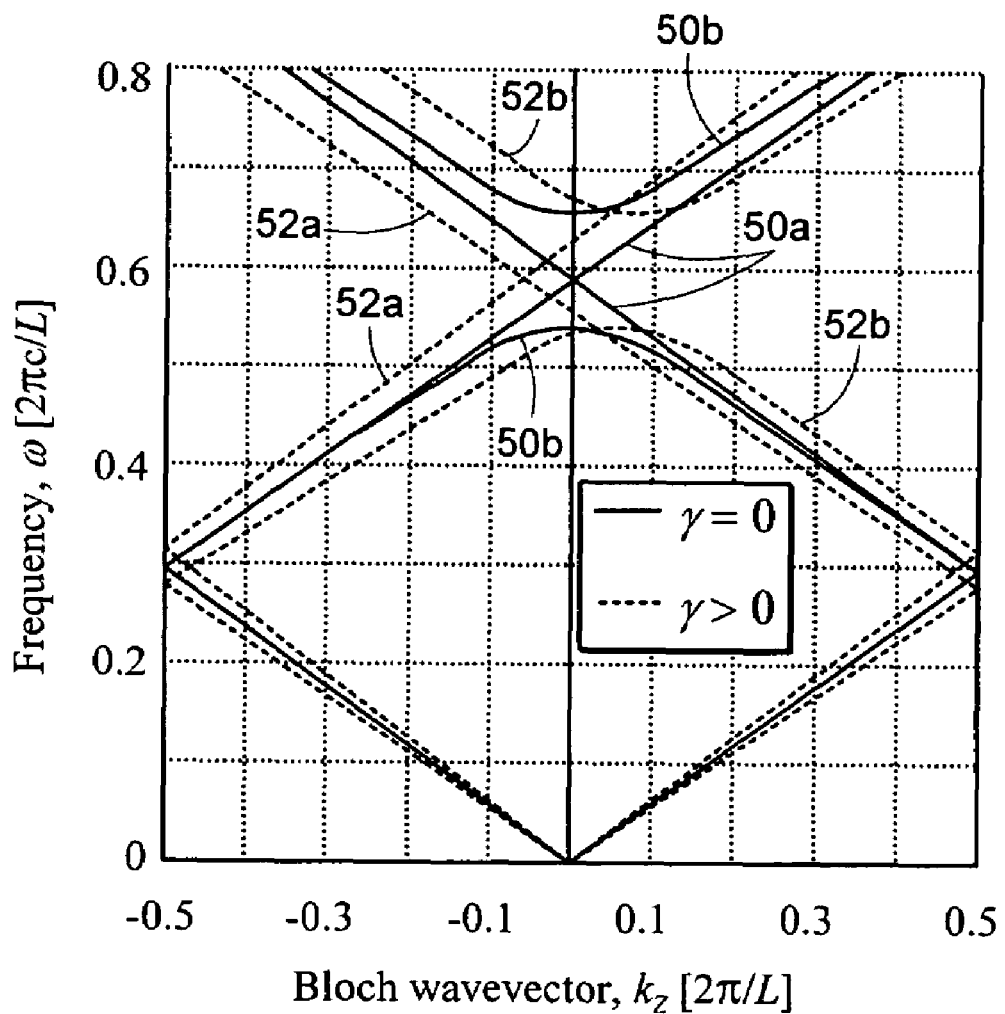
FIG. 4 shows an illustrative diagrammatic graphical representation of wavevectors versus frequency in the presence ($\gamma \neq 0$) and absence ($\gamma = 0$) of magneto-gyrotropy corresponding to the materials shown in FIGS. 1A and 1B.

In particular, FIG. 4 shows dispersion relations for axial propagation of electromagnetic waves in a uniform helical medium in the absence of magneto-gyrotropy ($\gamma=0$) as shown at 50a and 50b, and in the presence of magneto-gyrotropy where $\gamma>0$ as shown at 52a and 52b. The values 50a and 52a are for left-hand circularly polarized light, and the values 50b and 52b are for right-hand circularly polarized light. Similar dispersion relations for axial propagation of electromagnetic waves in a uniform helical medium in the presence of magneto-gyrotropy where $\gamma<0$ may be shown by inverting (flipping) the relation for $\gamma>0$ along the 0.0 wavevector (vertical line in graph). By examining, for example, the allowed modes at a reduced frequency of 0.6 when $\gamma \neq 0$, it may be seen that only two light modes may propagate, and while they are either both on the positive side or both on the negative side of the diagram (thus same sign of phase velocity, $\vec{v}_p = \omega/\vec{k}$), their slopes (i.e., group velocity, $\vec{v} = \partial\omega/\partial\vec{k}$) have opposite signs. Propagating waves for which $v_p \cdot v_g < 0$ are characteristic of negative refractive index materials, first postulated in 1968. See, for example, *The Electrodynamics of Substances with Simultaneously Negative Values of $\epsilon$ and $\mu$*, V. G. Veselago, Soviet Physics Usp., vol.10, no. 4, p.509 (1968); *Negative Refraction Makes a Perfect Lens*, J. B. Pendry, Physical Review Letters, v.85, no.18, p. 3966 (200); and *Experimental Verification of a Negative Index of Refraction*, R. A. Shelby, D. R. Smith, S. Schultz, Science, no.292, p.77 (2001). Uses of such materials may include a wide range of applications from nanotechnology and nano-imaging to radar technology and focusing much larger wavelength waves. While progress is continuously made towards understanding the negative refractive index properties and potential applications, there have been only few designs of actual negative refractive index materials, virtually all of them operating at the millimeter wavelength (microwave) scale for which the structured optical materials involves macroscopic metal wires, plates, etc.

Systems in accordance with various embodiments of the invention may utilize conventional fabrication techniques, and even self-assembling routes, thus allowing straightforward fabrication of structures working at much smaller wavelengths, such as the highly desirable visible and infrared regimes, other than the relatively macroscopic microwave spectral region (used in radar technology).

It has further been discovered that structurally chiral materials exhibit another significant property in addition to the negative refractive index behavior. When the structural chirality exhibits ellipticity (instead of a uniform, perfectly rotating, circular helix, e.g. imagine a non-uniform one, deformed perpendicular to the helix axis, with an elliptical cross-section, the variation of the strength of the magneto-gyrotropy ($\gamma$) results in very large changes of the group velocity (rate at which power is carried by the wave) in two frequency regions along a given propagation direction.

Figure 5A:
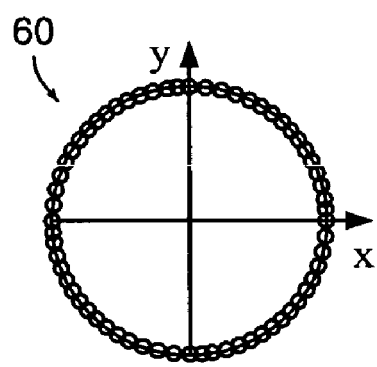
FIGS. 5–5C show illustrative diagrammatic representations of rotation angle distributions (uniformly spaced sampling along the z-axis) of a uniform helix, a helix that is deformed along an x direction, and a helix that is deformed along a y direction respectively in accordance with various embodiments of the invention.
Figure 5B:
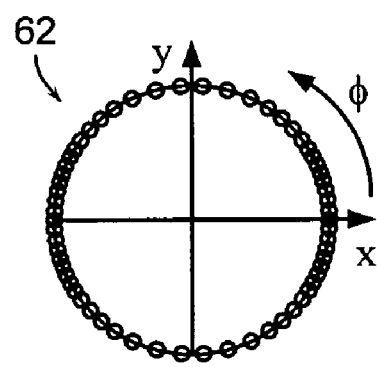
Figure 5C:
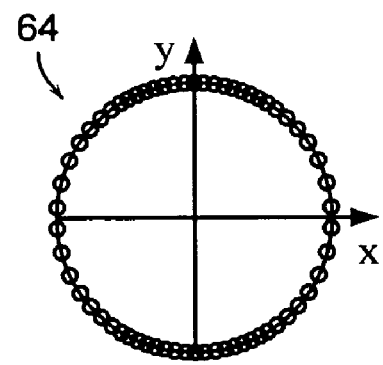

For example, the distribution of the elements of a helix may be changed from being uniformly distributed (as shown at 60 in FIG. 5A), to be biased along an x direction (as shown at 62 in FIG. 5B) or biased along a y direction as shown at 64 in FIG. 5C. This may be achieved by a variety of techniques, including mechanically deforming the helix in either the x or y direction to form an eliptical shaped helix in cross-section. In further embodiments, the helix may be designed to stretch when subjected to an electric or electromagnetic field, and in further embodiments, the electric permittivity and/or magnetic permeability may be changed (without mechanically acting on the helix) when subjected to an external magnetic or electromagnetic field.

Figure 6:
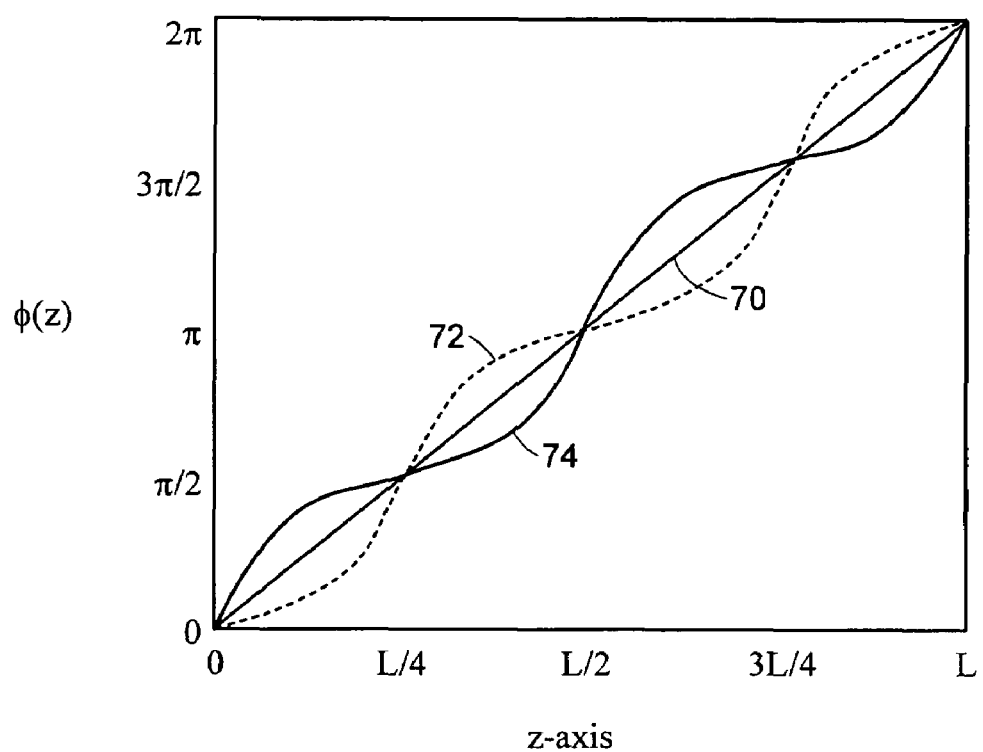
FIG. 6 shows an illustrative diagrammatic graphical representation of rotation angle distributions across the helix period for the helixes shown in FIGS. 5A–5C.

As shown in FIG. 6, the rotation angle distribution $\phi(z)$ may not be a linear function of z. In particular, while a uniformly distributed helix (as shown at 60 in FIG. 5A) may provide a substantially linear relation 70, an x-axis biased helix (as shown at 62 in FIG. 5B) may provide a non-linear relation 72, and a y-axis biased helix (as shown at 64 in FIG. 5C) may provide another non-linear relation 74.

Figure 7:
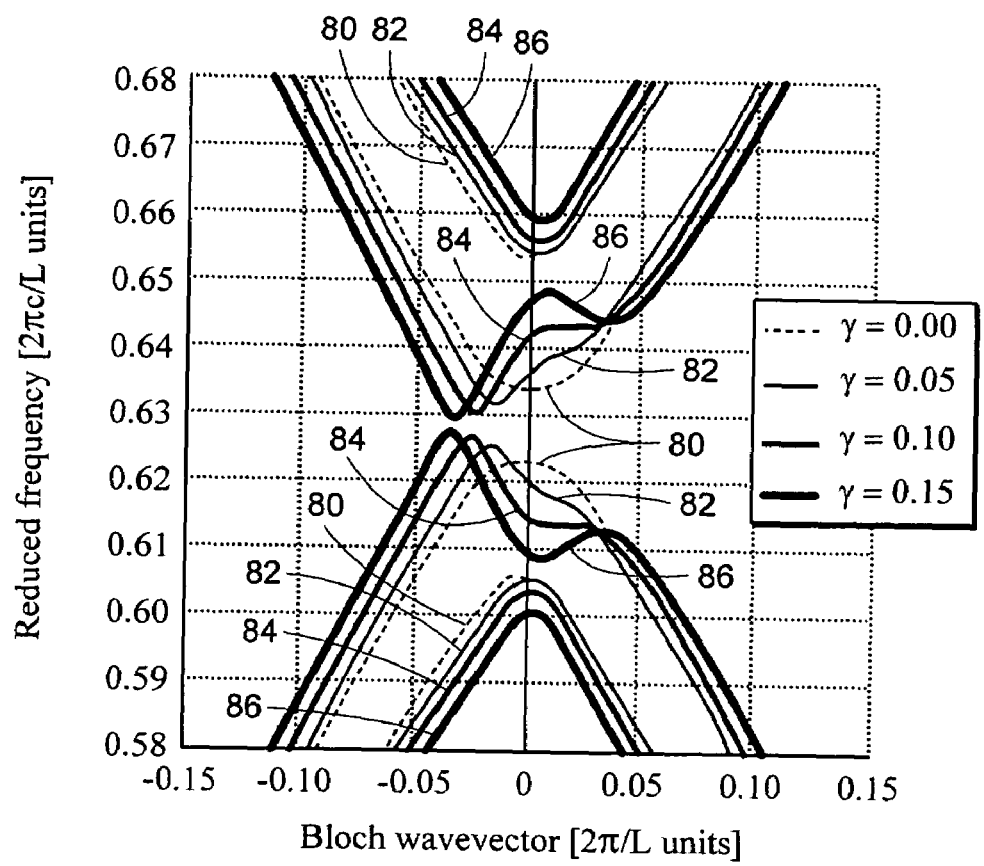
FIG. 7 shows illustrative diagrammatic graphical representations of wavevectors versus frequency for various values of magneto-gyrotropic strength.

As shown in FIG. 7, the variation of the strength of the magneto-gyrotropy ($\gamma$) results in very large changes of the group velocity (rate at which power is carried by the wave) in two frequency regions along a given direction (e.g., the z azis). In particular, FIG. 7 shows the effect of the strength of magneto-gyrotropy ($\gamma$) on the dispersion curves $\omega(k)$ for a non-uniform hybrid medium where $\gamma=0.00$ (as shown at 80), $\gamma=0.05$ (as shown at 82), $\gamma=0.10$ (as shown at 84), and $\gamma=0.15$ (as shown at 86).

While changing the velocity of light in a material by applying an external stimulus by itself has important practical applications in the design of various electromagnetic wave devices, there are further possibilities. In the above design, the application of an external stimulus changing the value of $\gamma$ can result in slowing down the wave beyond usual limits, as at one particular value of $\gamma$ the group velocity at frequency $\omega^*$ becomes zero and the effective mass of the photon becomes infinite, as shown at 84 in FIG. 7. In particular, the relation at 84 in FIG. 7 shows dispersion curves for a non-uniform helical medium with magneto-gyrotropy, when at $\omega=\omega^*$ one of the two allowed modes (with k*) has a zero group velocity and infinite photon effective mass.

Figure 8A:
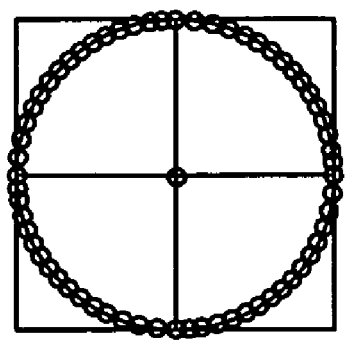
FIGS. 8A–8C shoe illustrative diagrammatic representations of rotation angle distributions of a uniform helix, a helix that is slightly deformed along an x direction, and a helix that is further deformed along an x direction respectively in accordance with various embodiments of the invention where x is a direction perpendicular to the helix axis, assumed along z"
Figure 8B:
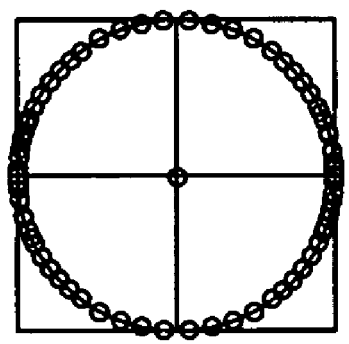
Figure 8C:
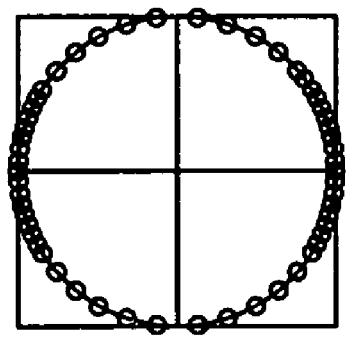
Figure 9:
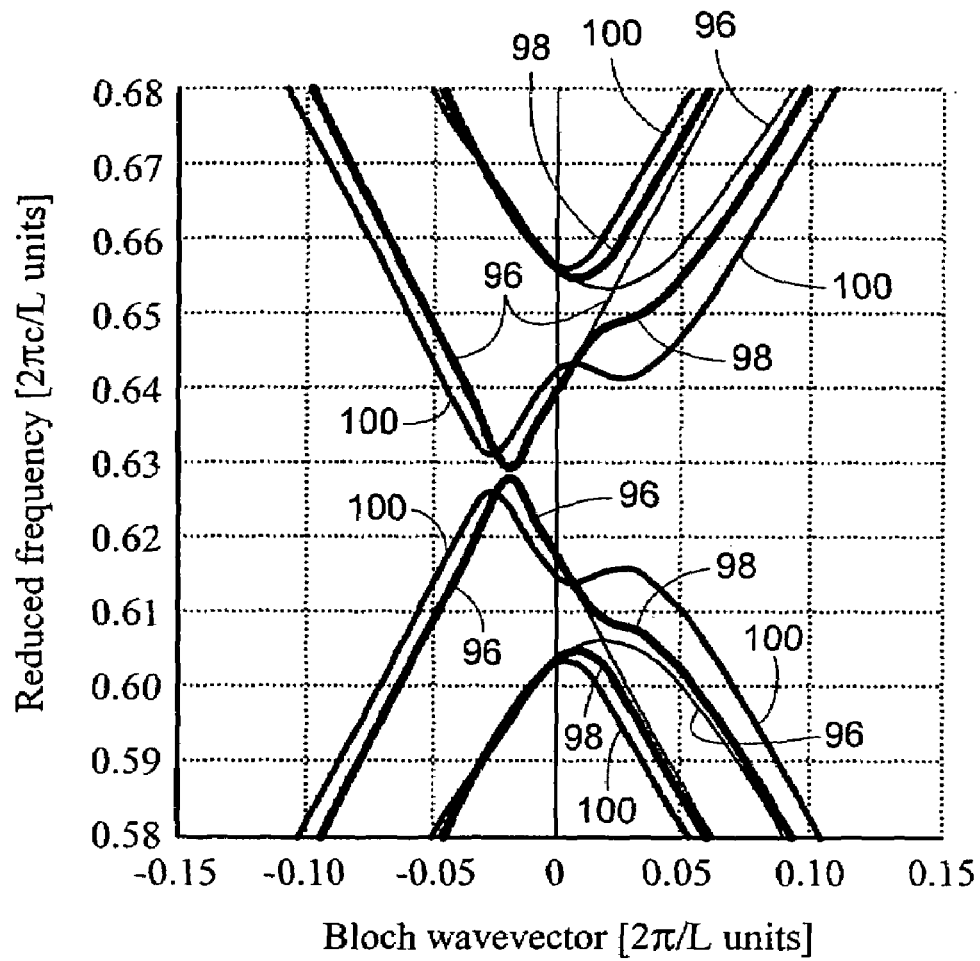
FIG. 9 shows an illustrative diagrammatic graphical representation of wavevectors versus frequency for the helixes shown in FIGS. 8A–8C.

The same qualitative situation depicted in FIG. 7 may be obtained by structurally perturbing the material (e.g., mechanical deformation) while keeping the magneto-gyrotropic strength constant. For example, as shown in FIGS. 8A–8C, a uniformly distributed helix as shown at 90 in FIG. 8A, may be slightly deformed along an x-direction as shown at 92 in FIG. 8B, or further deformed along an x-direction as shown at 94 in FIG. 8C. The resulting frequency response relations for the helixes 90, 92 and 94 are shown at 96, 98 and 100 respectively in FIG. 9.

Figure 10:
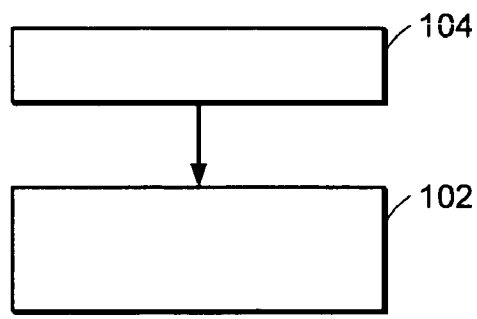
FIG. 10 shows an illustrative diagrammatic schematic view of a tunable optical system that may be formed using a structured material in accordance with an embodiment of the invention.
Figure 11:
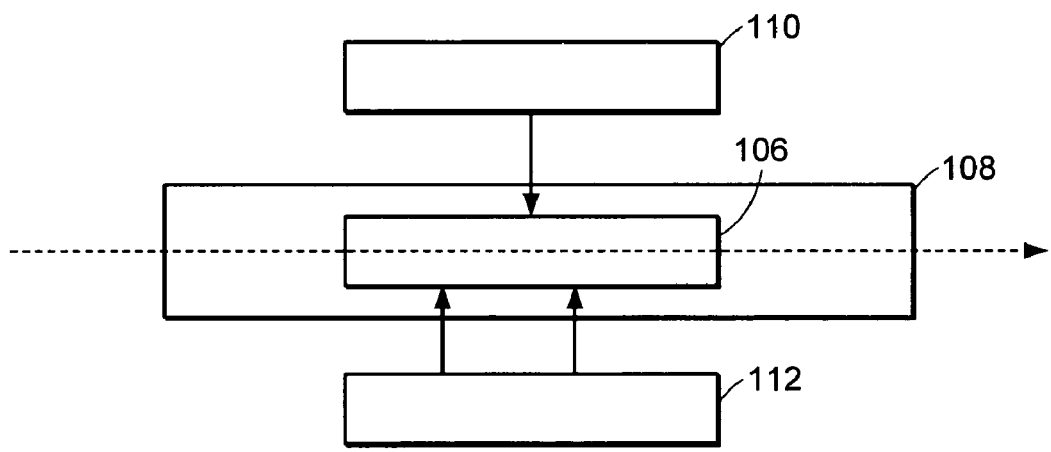
FIG. 11 shows an illustrative diagrammatic schematic view of a laser system that may be formed using a structured material in accordance with an embodiment of the invention.

As shown in FIG. 10, a structured material 102 of the invention may be used with a biasing unit 104 to change the frequency on interest $\omega^*$ may be tuned. Thus, the disclosed material design allows multiple pathways for tunability of its optical properties, such that at a frequency $\omega^*$ the only two allowed light waves can propagate either in the forward (+$\hat{z}$) or in the backward (−$\hat{z}$) direction, with one of them bearing a very special feature. In accordance with an embodiment, therefore, only a backward wave may have a finite group velocity (slope $\neq 0$), as the forward wave has a nearly zero velocity (inflection point at $\omega^*(k^*)$, slope→0). In addition, at $\omega^*(k^*)$ the curvature may also become zero, a situation that physically corresponds to wave with an infinite effective photon mass.

This material may thus not only act as an optical isolator (unidirectional propagation of light), but it may either trap light or just allow it to propagate at previously unseen reduced velocities in normal dielectric materials. This hybrid material design allows tuning the properties of the structure to properly match a material's $\omega^*$ to the desired application frequency. Finally, electromagnetic waves with frequencies very close to $\omega^*$ may propagate with such small velocities, that it is clear that the disclosed hybrid material opens avenues towards radically new, solid state based devices. Examples include optical buffering or memory (optical routers in telecom employ miles long optical fibers to introduce time delays), low threshold lasing, and a general enhancement of most other nonlinear optical phenomena which can be introduced by further adding active centers in the overall magneto-gyrotropic structurally chiral material as disclosed, for example in *Frozen Light*, S. John, Nature, no. 390, p.661 (1997). In general, a number of possible embodiments can be envisioned where practical devices take advantage of these special materials (either as the only, or as one of multiple components), all with the common feature of manipulating electromagnetic waves at optical, infrared, microwaves and other frequencies.

A material design therefore is provided that features a unique set of properties. These include the ability to propagate electromagnetic waves with an effectively negative refractive index, and the ability to dramatically slow down the waves inside the material to such an extent that the wave would effectively stop, that is, to exhibit a zero group velocity and infinite photon mass. Moreover, these properties are widely tunable by external stimuli such as magnetic field direction and intensity, mechanical deformation, etc.

In still further embodiments, a system may include a structured material 106 within a waveguide 108 that is coupled to a bias source 110 and an excitation source 112. The system may provide for light amplification by stimulated emission of radiation (lasing) by having the excitation source pump the cavity within the waveguide 108 that includes the structured material. If, for example, the output waver is slowed within the cavity, more efficient excitation and stimulated emission of photons may be achieved. The wavelength of the output wave may optionally be tuned by the biasing source 110.

In further embodiments, the invention may provide negative refractive index materials and the ability to reduce the speed of light to record low values. Since these may be exhibited at the same time and in the same material, another set of applications is enabled, where the combination is needed (as opposed to e.g., using the material simply as a negative refractive medium). Thus, many sets of applications are enabled by material design of certain embodiments of the invention that include various combinations of particular material structures, compositions (specific desirable hybrids from polymers, glasses, nanoparticles, etc.), and device architectures.

Various embodiments of the invention, therefore, provide for the use of negative refractive index materials for designing optical devices that are able to reversibly slow down and even stop and store light inside a material by applying an external stimulus (localization of light). Many further known and unknown potential uses may exist for materials of various embodiments of the invention.

Figure 12:
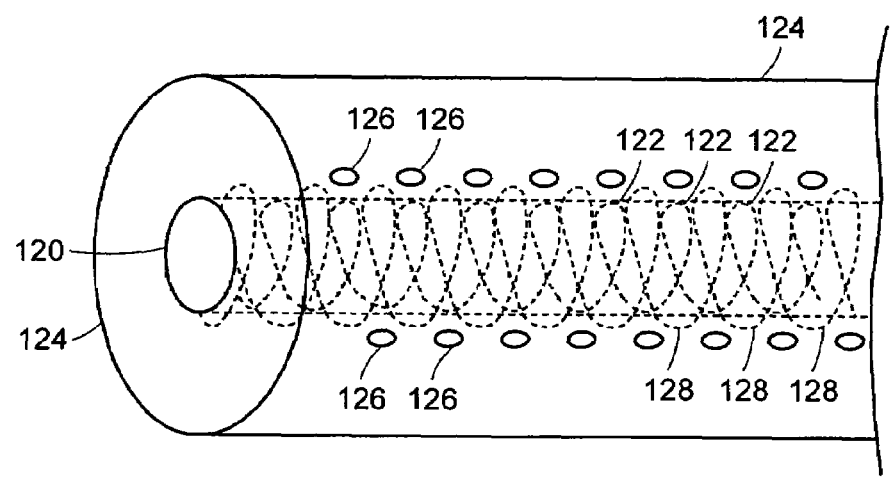
FIG. 12 shows an illustrative diagrammatic schematic view of an optical fiber that may be formed using a structured material in accordance with an embodiment of the invention.

In further embodiments, a structured material may be used as an optical waveguide or fiber optic device as shown in FIG. 12. In particular, the core 120 may include a chiral material 122 and the cladding 124 may have magneto-gyrotropic characteristics provided by magnetic elements 126. The cladding may also include chiral material 128 that, for example, is wrapped closely around but outside of the chiral material 122 of the core as shown in accordance with an embodiment. The core material may provide that light of a particular wavelength of interest may move in one direction at a speed that is much slower than the conventional speed of the light. Such a system may be suitable for use in coupling fiber optic communication systems with electronic devices that conventionally operate at much slower speeds than the speed of fiber optic communication.

Figure 13:
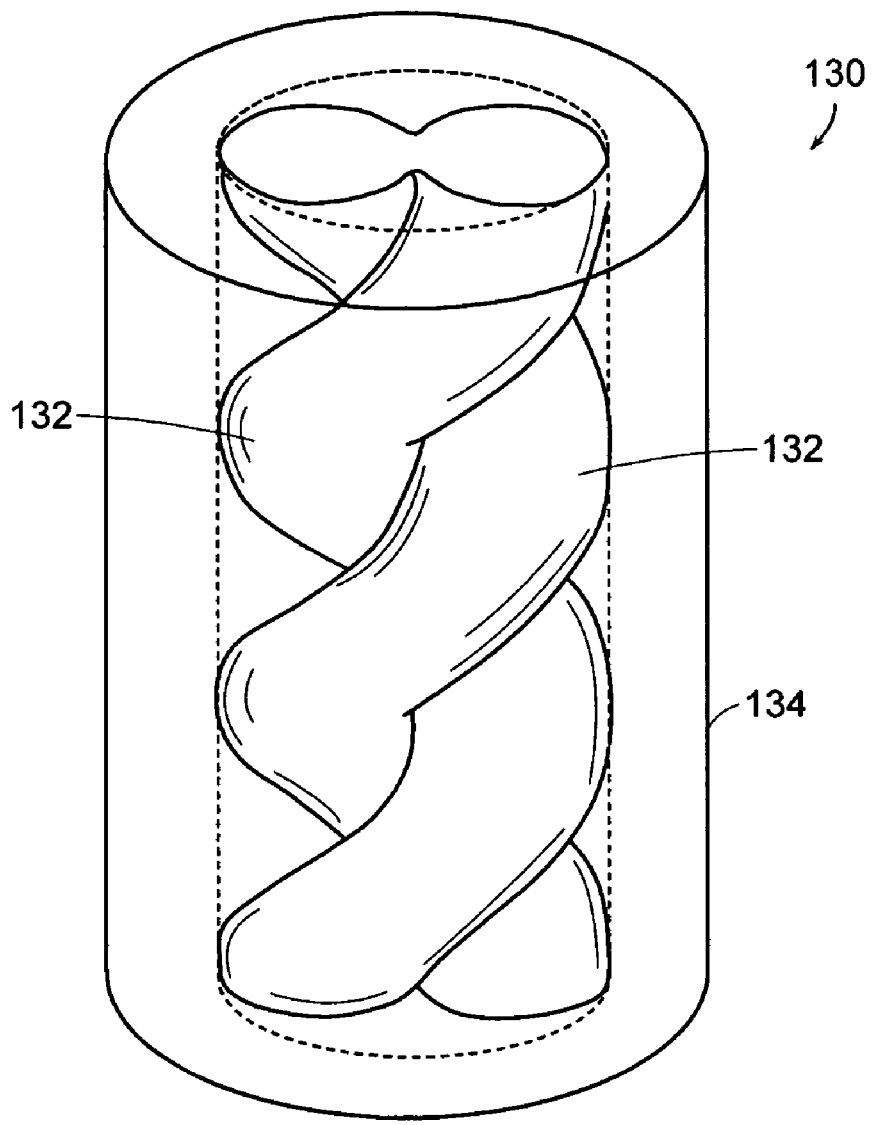
FIG. 13 shows an illustrative diagrammatic schematic view of another optical fiber that may be formed using a structured material in accordance with an embodiment of the invention.
Figure 14:
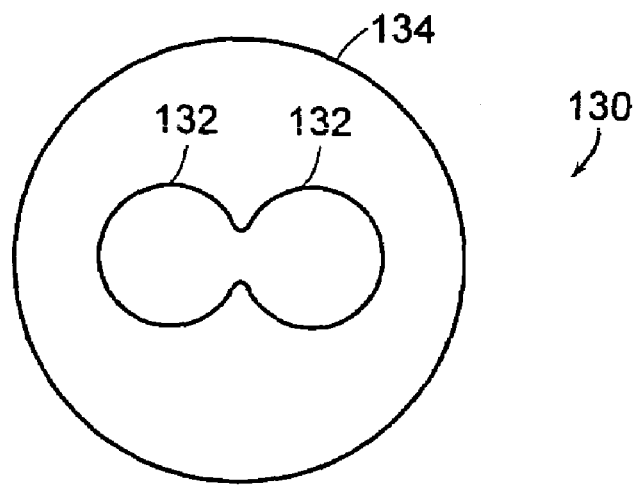
FIG. 14 shows an illustrative diagrammatic schematic end view of the optical fiber shown in FIG. 13.

In still further embodiments a waveguide or fiber optic device 130 may include a core 132 with structural chirality and a cladding 134 as shown in FIGS. 13 and 14. In this embodiment, the core 132 has a cross section that is symmetric upon a 180 degree in-plane rotation, and may be produced from a twisted pair of equal diameter fibers which are partially fused to form the structurally chiral core 132 as shown in FIGS. 13 and 14.

Figure 15:
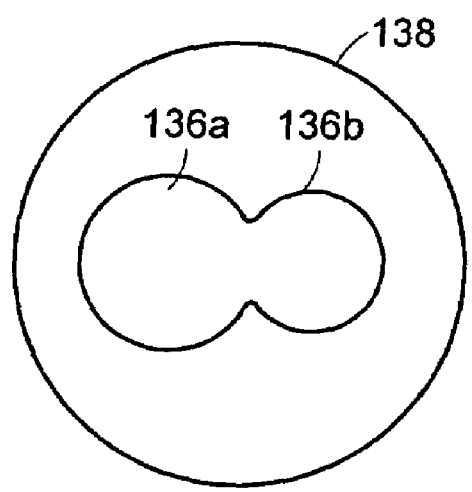
FIG. 15 shows an illustrative diagrammatic schematic end view of another optical fiber in accordance with a further embodiment of the invention.

In accordance with a further embodiment, the core may be formed such that its cross section is symmetric only upon a 360 degree rotation. In this embodiment, a core may be produced from a twisted pair of different diameter fibers 136a and 136b, which may be further partially fused to produce a structurally chiral core with an asymmetric cross section. This core may further include a cladding 138 as shown in FIG. 15. Again, at least one of the core material and the cladding material adjacent to the core has to display magneto-gyrotropic properties.

Those skilled in the art will appreciate that numerous variations, modifications and improvements may be made to the above disclosed embodiments without departing from the spirit and scope of the invention.

What is claimed is:

1. A structured material with magneto-gyrotropic characteristics including at least one continuous structurally-chiral material, said structured material having an electric permittivity and a magnetic permeability at least one of which varies within said structured material along a first direction in a repetitious fashion wherein a repetition unit includes a chiral component and is at least 25 nm in length, said structured material exhibiting non-reciprocal electromagnetic wave propagation velocity characteristics along a second direction that includes a non-zero component along said first direction.

2. The structured material as claimed in claim 1, wherein said structured material includes a gyromagnetic component, and said magneto-gyrotropic characteristics are due to said gyromagnetic component.

3. The structured material as claimed in claim 1, wherein said structured material includes a gyroelectric component, and said magneto-gyrotropic characteristics are due to said gyroelectric component.

4. The structured material as claimed in claim 1, wherein said structured material includes a permanent magnetic component, and said magneto-gyrotropic characteristics are due to said permanent magnetic component.

5. The structured material as claimed in claim 1, wherein said structured material includes a magnetizable component that may become magnetic in the presence of an external magnetic field, and said magneto-gyrotropic characteristics are due to said magnetizable component.

6. The structured material as claimed in claim 1, wherein the repetitious fashion is uniform.

7. The structured material as claimed in claim 1, wherein the repetitious fashion is non-uniform.

8. The structured material as claimed in claim 1, wherein the structurally chiral material also provides said magneto-gyrotropic characteristics.

9. The structured material as claimed in claim 1, wherein said repetition occurs in one dimension.

10. The structured material as claimed in claim 1, wherein said repetition occurs in two dimensions.

11. The structured material as claimed in claim 1, wherein said repetition occurs in three dimensions.

12. The structured material as claimed in claim 1, wherein the non-reciprocal electromagnetic wave propagation velocity characteristics include a first relationship between a group velocity and a phase velocity of an electromagnetic wave of a first frequency in a forward direction that is different than a second relationship between a group velocity and a phase velocity of the electromagnetic wave of said first frequency in a reverse direction that is opposite the forward direction.

13. The structured material as claimed in claim 12, wherein the first relationship between the group velocity and the phase velocity of the electromagnetic wave of the first frequency in the forward direction is a negative relationship such that the component of the group velocity along said direction is opposite to the component of the phase velocity along said direction.

14. The structured material as claimed in claim 1, wherein the non-reciprocal electromagnetic wave propagation velocity characteristics include a first group velocity of an electromagnetic wave with a first frequency propagating in a forward direction, and a second group velocity of an electromagnetic wave with said first frequency propagating in a reverse direction that is opposite to said forward direction, said first group velocity being smaller than said second group velocity.

15. The structured material as claimed in claim 1, wherein the non-reciprocal electromagnetic wave propagation velocity characteristics are affected by a bias source coupled to said structured material.

16. The structured material as claimed in claim 15, wherein said bias source couples to said structured material via any one of or via a combination of an external magnetic field, an external electric field, and/or an external mechanical deformation field.

17. A photonic crystal having both magneto-optic activity and structural chirality, said photonic crystal having a refractive index that varies within said structured material along a first direction in a repetitious fashion wherein a repeat unit includes a continuous structurally chiral material, said photonic crystal exhibiting non-reciprocal electromagnetic wave propagation velocity characteristics in a second direction that is not perpendicular to said first direction.

18. The photonic crystal as claimed in claim 17, wherein said magneto-optic activity is due to a spontaneously magnetized component.

19. The photonic crystal as claimed in claim 17, wherein said magneto-optic activity is introduced in a magnetizable component by an external magnetic field.

20. The photonic crystal as claimed in claim 17, wherein the repetitious fashion is uniform.

21. The photonic crystal as claimed in claim 17, wherein the repetitious fashion is non-uniform.

22. The photonic crystal as claimed in claim 17, wherein said repetition occurs in one dimension.

23. The photonic crystal as claimed in claim 17, wherein said repetition occurs in two dimensions.

24. The photonic crystal as claimed in claim 17, wherein said repetition occurs in three dimensions.

25. The photonic crystal as claimed in claim 17, wherein the non-reciprocal electromagnetic wave propagation velocity characteristics include a first relationship between a group velocity and a phase velocity of an electromagnetic wave with a first frequency in a forward direction that is different than a second relationship between a group velocity and a phase velocity of an electromagnetic wave with said first frequency in a reverse direction that is opposite the forward direction.

26. The photonic crystal as claimed in claim 25, wherein the first relationship between the group velocity and the phase velocity of the electromagnetic wave of said first frequency in the forward direction is a negative relationship such that the component of the group velocity along said direction is opposite to the component of the phase velocity along said direction.

27. The photonic crystal as claimed in claim 17, wherein the non-reciprocal electromagnetic wave propagation velocity characteristics include a first group velocity of an electromagnetic wave with a first frequency propagating in a forward direction, and a second group velocity of an electromagnetic wave with said first frequency propagating in a reverse direction that is opposite to said forward direction, said first group velocity being smaller than said second group velocity.

28. The photonic crystal as claimed in claim 17, wherein the non-reciprocal electromagnetic wave propagation velocity characteristics are affected by a bias source coupled to said photonic crystal.

29. The photonic crystal as claimed in claim 28, wherein said bias source couples to said photonic crystal via any one of or via a combination of an external magnetic field, an external electric field, and/or an external mechanical deformation field.

30. A waveguide having a central longitudinal axis, displaying both magneto-gyrotropic characteristics and structural chirality along said central longitudinal axis, said waveguide having an electric permittivity and a magnetic permeability at least one of which varies along said central longitudinal axis in a repetitious fashion, such that said waveguide displays non-reciprocal electromagnetic wave propagation characteristics along said central longitudinal axis.

31. The waveguide as claimed in claim 30, wherein said waveguide includes a spontaneously magnetized material which provides said magneto-gyrotropic characteristics.

32. The waveguide as claimed in claim 30, wherein said waveguide includes a magnetizable material which provides the magneto-gyrotropic characteristics under the action of an external magnetic field pointing in a direction that is not perpendicular to said longitudinal axis.

33. The waveguide as claimed in claim 30, further comprising at least one layer of cladding disposed around and along a core with magneto-gyrotropic characteristics.

34. The waveguide as claimed in claim 33, wherein said core displays both magneto-gyrotropic characteristics and structural chirality along said longitudinal axis.

35. The waveguide as claimed in claim 33, wherein said magneto-gyrotropic characteristics are concentrated in said core and said structural chirality is concentrated in the cladding layer immediately adjacent to said core.

36. The waveguide as claimed in claim 33, wherein said magneto-gyrotropic characteristics are concentrated in the cladding layer, while said core has weaker magneto-gyrotropic characteristics under the operating conditions.

37. The waveguide as claimed in claim 33, wherein both said magneto-gyrotropic characteristics and structural chirality are concentrated in the cladding layer, while said core has weaker magneto-gyrotropic characteristics.

38. The waveguide as claimed in claim 33, wherein a cross-section of said core is non-circular and symmetric upon a 180 degree rotation in the cross-sectional plane, said structural chirality being provided by a continuous twist of said core about the central longitudinal axis.

39. The waveguide as claimed in claim 33, wherein a cross-section of said core is non-circular and symmetric upon a rotation in the cross-sectional plane only when the rotation angle is 360 degrees, said structural chirality being provided by a continuous twist of said core about the central longitudinal axis.

40. The waveguide as claimed in claim 30, wherein the non-reciprocal electromagnetic wave propagation velocity characteristics include a first relationship between a group velocity and a phase velocity of an electromagnetic wave with a first frequency in a forward direction along said central longitudinal axis that is different than a second relationship between a group velocity and a phase velocity of an electromagnetic wave with said first frequency in a reverse direction that is opposite the forward direction.

41. The waveguide as claimed in claim 40, wherein the first relationship between the group velocity and the phase velocity of the electromagnetic wave of said first frequency in the forward direction is a negative relationship such that the component of the group velocity along said direction is opposite to the component of the phase velocity along said direction.

42. The waveguide as claimed in claim 30, wherein the non-reciprocal electromagnetic wave propagation velocity characteristics include a first group velocity of an electromagnetic wave with a first frequency propagating in a forward direction along said central longitudinal axis, and a second group velocity of an electromagnetic wave with said first frequency propagating in a reverse direction that is opposite to said forward direction, said first group velocity being smaller than said second group velocity.

43. The waveguide as claimed in claim 30, wherein the non-reciprocal electromagnetic wave propagation velocity characteristics are affected by a bias source coupled to said waveguide.

44. The waveguide as claimed in claim 43, wherein said bias source couples to said waveguide via any one of or via a combination of an external magnetic field, an external electric field, and/or an external mechanical deformation field.

45. The waveguide as claimed in claim 42, wherein under the action of said bias source said waveguide changes velocities at which it propagates different frequency components of an electromagnetic pulse, for the purpose of altering the temporal and/or spatial shape of said pulse.

46. The waveguide as claimed in claim 42, wherein under the action of said bias source said waveguide allows two or more electromagnetic waves with different frequencies to propagate with the same velocities, for the purpose of maximizing the interaction between said electromagnetic waves.

47. A system for achieving non-reciprocal electromagnetic wave propagation characteristics, said system including a structured material exhibiting both magneto-gyrotropy and structural chirality, said structured material having an electric permittivity and magnetic permeability at least one of which varies in a repetitious fashion along at least a first direction, wherein the repetition unit includes a continuous structurally chiral material, and said electromagnetic wave propagation characteristics are manifested in a second direction that is not perpendicular to said first direction.

48. The system as claimed in claim 47, wherein said non-reciprocal electromagnetic wave propagation characteristics include a first transit time for a narrow frequency bandwidth electromagnetic pulse propagating across said system in a forward direction that is not perpendicular to said first direction, which is longer than a second delay time of an identical pulse propagating in a reverse direction that is opposite to said forward direction.

49. The system as claimed in claim 47, wherein said structured material further includes an electromagnetic gain material component.

50. The system as claimed in claim 49, wherein said non-reciprocal electromagnetic wave propagation characteristics include amplification of an electromagnetic pulse propagating across said system in a forward direction that is not perpendicular to said first direction.

51. The system as claimed in claim 47, wherein said non-reciprocal electromagnetic wave propagation characteristics include attenuation of an electromagnetic pulse propagating across said system in a forward direction that is not perpendicular to said first direction.

52. The system as claimed in claim 47, wherein said non-reciprocal electromagnetic wave propagation characteristics include frequency dispersion compensation for reshaping an electromagnetic pulse propagating in a forward direction that is not perpendicular to said first direction.

53. The system as claimed in claim 47, wherein the non-reciprocal electromagnetic wave propagation characteristics are affected by a bias source coupled to said structured material.

54. The system as claimed in claim 53, wherein said bias source couples to said structured material via any one of or via a combination of an external magnetic field, an external electric field, and/or an external mechanical deformation field.

* * * * *